F. W. BARHOFF.
MEANS FOR SEALING STORAGE BATTERY COVERS IN CELLS.
APPLICATION FILED APR. 7, 1919.

1,328,358. Patented Jan. 20, 1920.

Inventor:
Fred W. Barhoff by
Harry R. Williams
Atty.

UNITED STATES PATENT OFFICE.

FRED W. BARHOFF, OF HARTFORD, CONNECTICUT, ASSIGNOR TO THE HARTFORD STORAGE BATTERY MANUFACTURING COMPANY, OF HARTFORD, CONNECTICUT, A CORPORATION OF CONNECTICUT.

MEANS FOR SEALING STORAGE-BATTERY COVERS IN CELLS.

1,328,358.      Specification of Letters Patent.      Patented Jan. 20, 1920.

Application filed April 7, 1919. Serial No. 288,097.

*To all whom it may concern:*

Be it known that I, FRED W. BARHOFF, a citizen of the United States, residing at Hartford, in the county of Hartford and State of Connecticut, have invented a new and useful Improvement in Means for Sealing Storage - Battery Covers in Cells, of which the following is a specification.

The covers of storage battery cells are necessarily, in order to prevent the electrolyte from escaping, sealed in the jars. This invention relates to means for effecting such sealing of the covers in the jars of storage batteries. This sealing is customarily accomplished by either flooding the top of the cell or filling a channel around the edge of the cover with a melted insulating compound. In order to remove such material when the battery is to be taken down for cleaning or repairs, it is necessary to dig out or melt and pour out the hardened compound.

The object of this invention is to provide means whereby the covers of storage battery cells may be very quickly, tightly and durably sealed in the jars in such manner that the electrolyte cannot escape, without the employment of a sealing compound, and thereby permitting the removal of the covers, when it is desired to open the cells, without the application of heat.

This object is attained by locating a rubber or similar tube or packing in a groove formed around the outer edge of the cover and providing means whereby the tube may be inflated with fluid so that it will expand outward and pack the joint between the inner wall of the jar and the edge of the cover.

Figure 1:
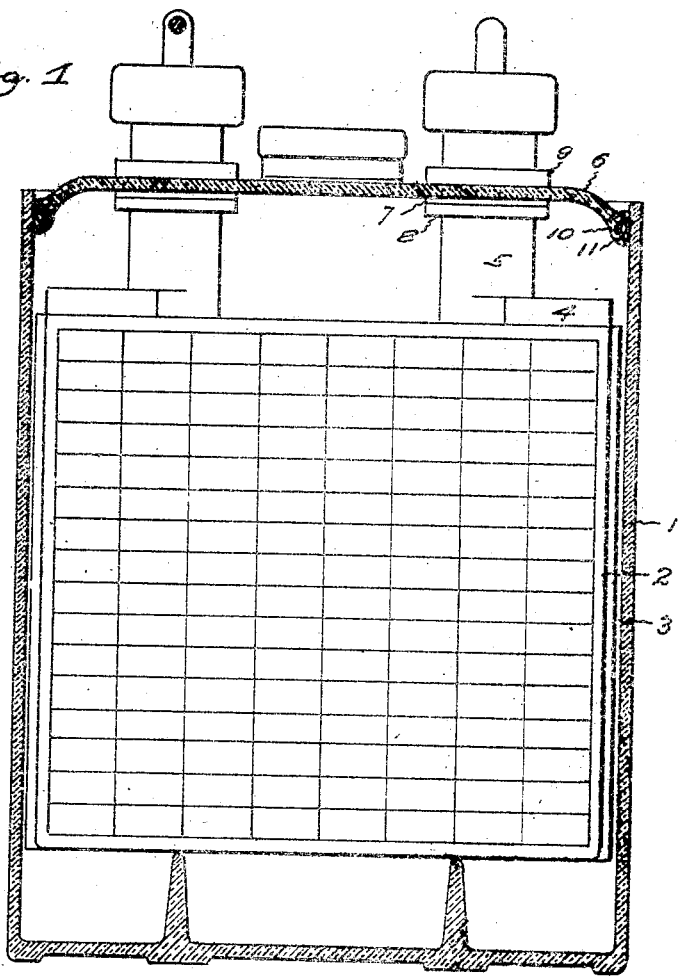
Figure 2:
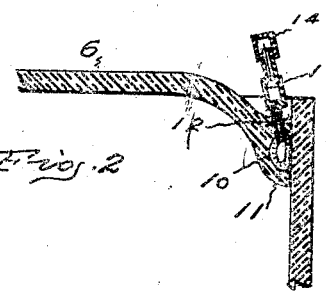

In the accompanying drawings Figure 1 shows a side elevation of a storage battery with the jar and cover cut in vertical section, illustrating the manner of sealing the cover in the jar according to this invention. Fig. 2 shows on larger scale a section of the means for sealing the cover.

The jar 1, which is illustrated, is of ordinary construction and of common material and contains the usual elements comprising plates 2, separators 3, straps 4 to which the plates are attached, and terminal posts 5 that are integral with the plate supporting straps. The posts extend upwardly through openings in the cover 6 and are sealed by any convenient means, preferably between the packing gaskets 7 on the post collars 8 below the cover and the rings 9 above the cover.

Around the edge of the cover that is illustrated is a groove 10 which is desirably semi-circular in cross section, and in this groove around the edge of the cover is located a rubber tube 11. This tube may be provided with a common form of nipple 12 having an inwardly opening and an outwardly seating spring closed valve 13, and cap 14 screwed on its outer end.

When it is desired to seal in the jar a cover provided with the means described, the cap is removed and the nipple connected with a tube from any convenient source of fluid supply, and fluid, usually air, is pumped into the tube so as to inflate and cause it to fill the groove and pack tightly against the inner wall of the jar.

With this arrangement the cover may be quickly and tightly sealed without the employment of molten compound, and the cover can be readily released by opening the valve and allowing the fluid in the tube to escape.

The invention claimed is:—

1. The combination with a storage battery jar of a cover fitting the jar, said cover having a groove in its outer edge, a flexible tube located in said groove, and means whereby said tube may be inflated with fluid.

2. The combination with a storage battery jar of a cover fitting the jar, said cover having a semi-circular groove in its outer edge, an air tight rubber tube located in said groove, and a valve nipple connected with the tube and providing means whereby the tube may be inflated with air.

3. The combination with a storage battery jar of a cover fitting the jar, said cover having a groove in its outer edge, a flexible packing arranged in said groove, and means whereby fluid may be forced back of said packing for expanding the packing in the groove against the inner wall of the jar.

4. The method of sealing a cover in a storage battery jar which consists of forming a groove around the edge of the cover, locating a tube in said groove and inflating said tube with fluid and expanding it outward of the groove against the inner wall of the jar.

5. The method of sealing a cover in a storage battery jar which consists in providing the perimeter of the cover with a flexible tube and inflating said tube and causing it to expand between the outer edge of the cover and the inner wall of the jar.

FRED W. BARHOFF.